No. 874,567. PATENTED DEC. 24, 1907.
R. W. BROWN.
ELECTRIC CONTROLLER.
APPLICATION FILED FEB. 19, 1907.
2 SHEETS—SHEET 1.
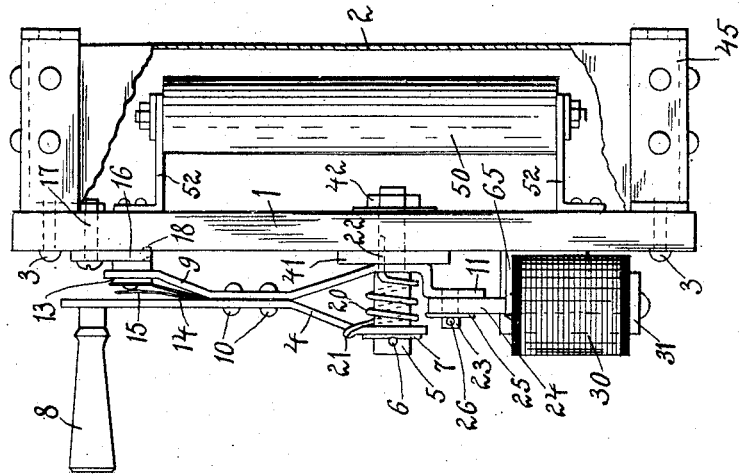
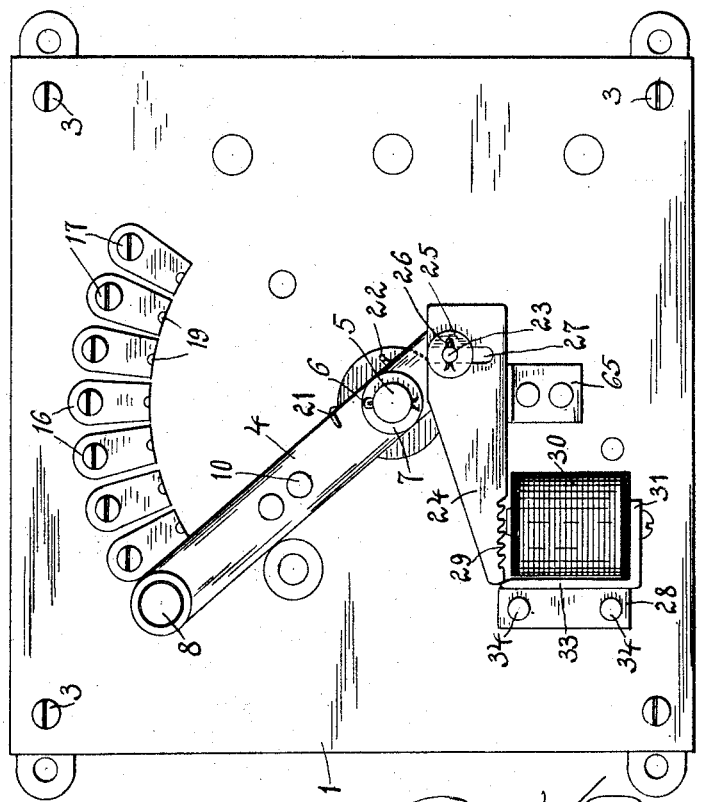
WITNESSES
S. Herzog
V. N. Fell
INVENTOR
Roy W. Brown
BY
Faust F. Crampton
ATTORNEY No. 874,567. PATENTED DEC. 24, 1907.
R. W. BROWN.
ELECTRIC CONTROLLER.
APPLICATION FILED FEB. 19, 1907.
2 SHEETS—SHEET 2.
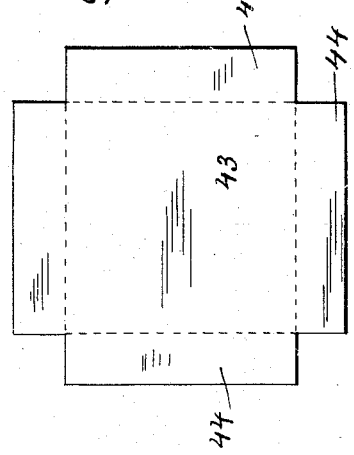
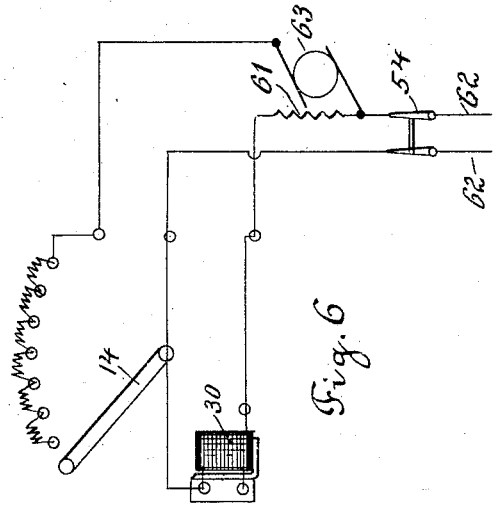
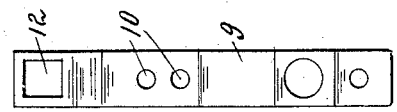
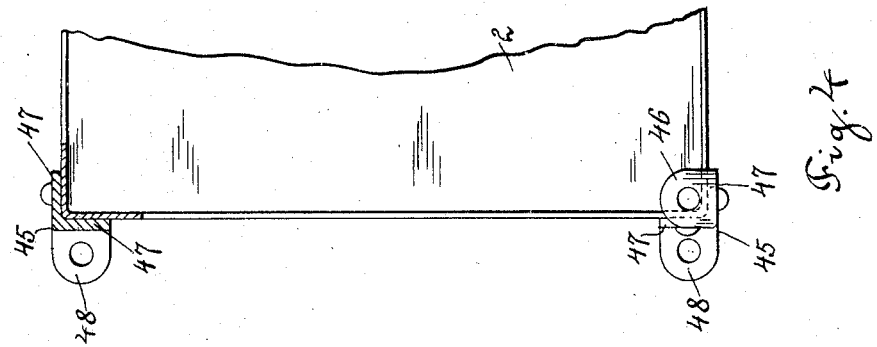
WITNESSES
S. Herzog
V. N. Fell
INVENTOR
Roy W. Brown
BY
Faust F. Crampton
ATTORNEY
THE NORRIS PETERS CO., WASHINGTON, D. C.

UNITED STATES PATENT OFFICE.

ROY W. BROWN, OF AMSTERDAM, NEW YORK.

ELECTRIC CONTROLLER.

No. 874,567.   Specification of Letters Patent.   Patented Dec. 24, 1907.

Application filed February 19, 1907. Serial No. 358,300.

*To all whom it may concern:*

Be it known that I, ROY W. BROWN, a citizen of the United States, and a resident of Amsterdam, State of New York, have invented new and useful Improvements in Electric Controllers, of which the following is a specification.

My invention has for its object to provide an electric controller for controlling the quantity of current that is fed to or from any electrical device or system.

The invention particularly relates to motor controllers.

The invention has for its object to provide a rheostat for controlling the current for operating an electric motor and a means for supporting and containing the said rheostat.

The invention also has for its object to provide a means for controlling the rheostat and which will prevent the automatic operation of the rheostat arm until the circuit of the motor or other device is broken whereupon the rheostat will return automatically to the normal condition.

The invention consists in providing a rheostat having a contact which is spring actuated to move in one direction and an electro magnet for controlling the said contact.

The invention consists further in providing a means for controlling the said movable contact, the said means consisting of a ratchet which is adapted to engage with a fixed body and wherein the said ratchet is controlled by an electro-magnet.

The invention also consists in providing a movable contact which is controlled by a ratchet, the ratchet being in turn controlled by an electro magnet.

The invention also consists in providing a rheostat box which may be easily assembled to contain the parts of the said rheostat and for supporting the said rheostat.

The invention consists in other features set forth in the following description, shown in the drawings and claimed in the claims.

Referring to the drawings, Figure 1 is a top view of my invention. Fig. 2 is the side view of the same shown partly in section. Fig. 3 illustrates one of the details of construction of the rheostat. Fig. 4 is a sectional view of the box showing some of the details of construction. Fig. 5 is an illustration of the sheet of metal of which the box is formed. Fig. 6 is a diagrammatic view showing the connections of the parts of the rheostat with an external circuit and particularly with the motor with which it is designed in the particular instance to control.

Having described my invention in general I will describe the parts of the invention in detail by reference to the drawings.

The reference numerals indicate the same parts in all drawings.

Referring to Figs. 1 and 2, 1 is the top of the box for supporting the rheostat. This consists preferably of slate or stone and constitutes the face plate or panel. It is supported by the box 2 as shown in Fig. 2. The plate 1 is attached to the said box by the screws 3, 3. On the top of the box is located a switch contact which is controlled by a pivoted bar 4. The bar 4 is pivoted on the pivot pin 5 and is held thereon by the pin 6 and the washer 7. The pin 5 passes through the panel 1 and secures the disk 41 to the face plate 1. The pin 5 is secured by means of the nut 42. The bar 4 is provided with the handle 8. A crooked bar 9 is attached to the bar 4 by the studs 10. The bar 9 is shown in Figs. 2 and 3. The pin 5 also passes through the bar 9. This prevents any looseness, the two bars being separated at the point where the pin passes through the bars. The part 9 is provided at one end with an opening 12. A contact shoe 13 is adapted to be inserted in the opening 12 of the bar 9 and is freely movable through the said opening. The contact 13 is connected to the switch arm by means of the electrical connection 14 and it is spring pressed downward by the operation of the spring 15 which tends to push the contact through the opening 12 of the bar 9. The connection 14 and the spring 15 is attached to the lever formed by the two bars 4 and 9 by means of the bolts 10.

The contact 13 moves over a series of fixed contacts 16, 16 which are located on the marble or slate panel 1. The contacts 16, 16 are secured in place by means of the screw bolts 17, 17. The contacts are also provided with lugs 18 shown in Fig. 2 which are pressed downward by means of a metal press in the formation of the contact. The lugs 18 extend down into the panel and prevent the turning or movement of the contacts 16 and together with the screws 17 operate to secure the contacts 16 in place. The contact 13 is pressed against the contacts 16 by the spring 15. As the bar 9 is swung to the right or to the left, the contact 13 slides over the contacts 16.

The bar 4 is spring operated. A spring 20 is provided with a hook 21 which is adapted to engage with the bar 4. The other end 22 of the spring is adapted to engage with the face plate 1. As the bar 4 is swung to the right it is moved against the tension of the spring.

The lower end 11 of the bar 9 extends below the pivot pin 5 and is raised from the plate 1 and is provided with a pin 23. The pin 23 extends through a slot 27 located in a ratchet 24. The slot 27 permits longitudinal movement of the ratchet while the bar 9 which operates it moves about a pivot. A washer 25 is located between the surface of the oblong body 24 and the securing pin 26. The ratchet is oblong and moves upon a bracket 28. As the arm is swung to the right, the oblong body 24 is moved to the left and moves over the bracket 28 and a bracket 65. The ratchet 24 is adapted to be secured in position by means of the combined means of the bracket 65 and the bar 9 and pin 23.

The ratchet moves over a magnet 30 and is adapted to be engaged thereby and thus constitutes the armature of the magnet. The electro magnet 30 is supported upon the bracket 28. The portion 31 of the bracket 28 extends outward and is adapted to support the magnet 30. The bracket is bent so as to form a wide electro-magnetic pole 33 at one side thereof. The bracket 28 is secured to the panel 1 by means of the screws 34. The upper end of the pole 33 has a curved and a slanting or beveled edge. The said edge of the pole is adapted to register with the recisions between the teeth 29 of the ratchet 24. The magnet 30 and its poles are so supported relative to the ratchet 24 that one part of the ratchet will move over the top of the electro magnet proper and also slide over the pole 33. As the bar 4 and bar 9 is moved to the right the ratchet 24 will be slid to the left and the arm may be secured in any position by the magnet and connection will be made between the movable contact and any of the fixed contacts according to the position in which the bar and ratchet are secured. If a current passes through the magnet the ratchet may be secured in any position to which it is moved, the ratchet and the pole of the magnet being such that operation of the two will normally prevent movement of the ratchet to the right by means of the spring but will permit movement to the left. If additional force is applied the rounded edge of one of the poles of the magnet permits movement of the bar or switch arm to the left and the ratchet to the right, the combined operation of the spring and magnet being such that the ratchet will always move to a point such that it will engage with the pole of a magnet and so that the movable contact will come to rest squarely on a fixed contact thus preventing arcing and burning out of the contacts. The teeth of the ratchet and the pole of the magnet is also such that while no current is passing through the magnet the ratchet may be freely moved right or left, the teeth of the ratchet being adapted to slide over the pole 33.

The box for containing the rheostat is formed of the plate 43, shown in Fig. 5, the corners of the said plate being struck out. The sides are formed by turning up the edges 44, 44. The corners are closed and the sides are secured by means of the corner pieces 45, shown in Figs. 3 and 4. The corner pieces 45 have in each case a portion 46 bent inward and extending over the upper edge of the body of the box 2. This inwardly extending portion is tapped and is adapted to receive the screws 3. The said portion 46 is also rounded as shown at Fig. 4. The corner pieces are also provided in each case with two side portions 47, 47 which are bent so as to be at right angles to each other and are located on the sides of the box. The corner pieces are also provided with a portion 48 which is bent outward and located at the lower edge or bottom of the box. The part 48 is provided with screw holes as shown in Figs. 1 and 4, and may be secured to any supporting means whatsoever. The edges of the box are turned up and the corner pieces are attached to the box. This forms a very compact and easily made box which incloses the resistance for the rheostat and supports the face plate 1 and the other parts of the rheostat. The box can be easily made and easily assembled, all its parts being struck up from sheet metal and readily attached to each other.

In Fig. 2 is shown a resistance element body 50 which is composed of cement in which is embedded the resistance wire. The resistance element 50 is attached by means of brackets 52 to the face of the panel 1 and is located in the box. Lead lines may be connected from the said brackets 52 or extra wires may be connected directly to the resistance body embedded in the cement. The resistance bodies are connected to the contacts 16, 16 so that the resistances will be located between the contacts in the circuit of the rheostat.

In Fig. 6 is shown diagrammatically the connection of the rheostat and the motor to the main line.

The circuit coming from the main lines passes through the switch 54 and to the rheostat connector 14. At this point the current divides, part of it passing through the electro magnet 30 to the field 61 of the motor and back to the main line 62. The other part passes through the connector 14 and when the connector 14 is moved to the right it passes through contacts 16 and through the resistances of the rheostat to the armature 63 of the motor and to the main lines 62. As the connector 14 is moved over to the right the amount of the resistance in the armature circuit is reduced. This is done as the motor receives the current and the armature increases in its speed until the full power of the line is turned upon the motor. If the switch 54 is opened the arm 14 will automatically return to its normal position.

The invention may be modified by those skilled in the art without departing from the spirit thereof.

What I claim as new and desire to secure by Letters Patent is as follows:

1. In an electric controller the combination of a bar a ratchet connected with the said bar, an electro magnet adapted to engage the said ratchet.

2. In a rheostat the combination of a magnet, a spring actuated contact, a plurality of fixed contacts, a body connected to the said spring actuated contact and having teeth adapted to engage the said electro magnet to hold the said spring actuated contact upon the said fixed contacts.

3. In a rheostat the combination of an electro magnet, a spring actuated contact, a plurality of fixed contacts, a rack movable over the said electro magnet and so arranged that the said spring actuated contact will be permitted to move to such a position that the said spring actuated contact will make contact with one of the said fixed contacts and will be held in the said position against the retractive power of the spring actuated contact when the said magnet is energized and directly engages the said rack.

4. In a rheostat the combination of a spring actuated contact, a plurality of fixed contacts, a magnet, the said magnet having a notched armature connected to the said spring actuated contact and so arranged as to engage mechanically and magnetically with the poles of the said magnet when the magnet is energized.

5. In a rheostat the combination of a spring actuated switch, an electro magnet and a notched armature, one of the poles adapted to engage with the notches of the said armature.

6. In a rheostat the combination of a spring actuated switch, an electro magnet, a notched armature, the said notched armature connected with the said switch so as to permit the said armature to move longitudinally and the said switch to move rotatively.

7. In a rheostat the combination of a spring actuated switch, an electro magnet, an armature, the said armature connected with the said switch in such a way as to permit the said switch to move rotatively while the said armature moves longitudinally.

8. In a rheostat the combination of a spring actuated switch, an electro magnet and a notched armature, one of the poles of the said magnet having an engaging edge adapted to engage with the said armature at its notches.

9. In a rheostat the combination of a spring actuated switch, an electro magnet, a notched armature, the said armature adapted to move transversely the poles of the said magnet one of the said poles of the said magnet adapted to engage the said armature at its notches.

10. In a rheostat the combination of a spring actuated switch, an electro magnet, an armature adapted to move across the poles of the said magnet and mechanical means for causing the said armature to engage with one of the poles of the said magnet and lock the same in certain positions.

11. In a rheostat the combination of a spring actuated switch, an electro magnet, an armature adapted to move across the poles of the said magnet and a mechanical means adapted to permit the said armature to move across the said poles in one direction and to normally prevent a return motion of the said armature while the magnet is energized.

12. In a rheostat the combination of a spring actuated switch, an electro magnet, a notched armature adapted to move across the ends of the said poles, one of the said poles having a rounded edge and adapted to engage with the said armature at its notches and to normally prevent the return of the said spring actuated switch until the said magnet is deënergized.

13. In a rheostat the combination of a spring actuated switch, an electro magnet, a notched armature connected with the said switch and adapted to permit rotative movement of the said switch while the said armature moves longitudinally and across the poles of the said magnet, one of the said poles adapted to mechanically engage the said armature at its notches.

14. In a rheostat the combination of a spring actuated switch, an electro magnet, a notched armature connected with the said switch and adapted to permit rotative movement of the said switch while the said armature moves longitudinally and across the poles of the said magnet, one of the said poles having a beveled end and rounded edge and adapted to engage with the said armature at its notches to permit movement of the said switch in one direction while the magnet is energized and to prevent operation of the spring to cause movement of the switch in the opposite direction while the magnet is energized.

15. In an electric controller the combination of a face plate, a plurality of fixed contacts, resistances connected to the said fixed contacts, a movable contact, the said fixed contacts and resistances and movable contact mounted on the said face plate, a box struck out of a single sheet, corner pieces adapted to cover the ends of the sides of the said box, the said sides being riveted to the said corner pieces, an end portion of each of the said corner pieces being bent inward over the edge of the corner of the box and secured to the said face plate and a lower portion of the said corner piece extending outward and at right angles to the said corner for securing the box to some fixed body.

16. In an electric controller the combination of a plurality of fixed contacts and resistances, a movable contact, a face plate, a box, the body struck out of a single sheet and having corners divided into portions, one of the said portions of each corner being bent inward over the edge of the body of the box and secured to the said face plate and a portion extending outward and at right angles to the said corner for securing the said box to some fixed object.

In testimony whereof, I have signed my name to this specification, in the presence of two subscribing witnesses.

ROY W. BROWN.

Witnesses:
JOHN E. LARRABEE,
HARRY HOWARD.